May 3, 1927.
C. ANDRADE, JR
1,626,907
DIFFERENTIAL
Filed July 9, 1924
4 Sheets-Sheet 1
FIG. 1
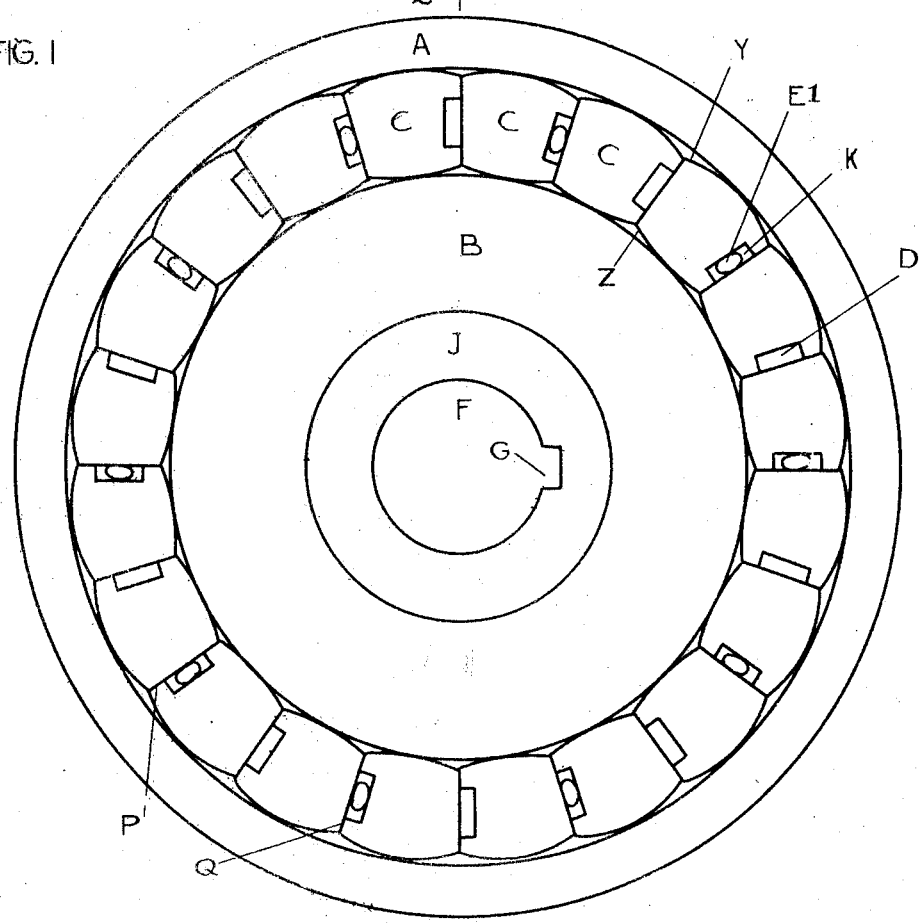
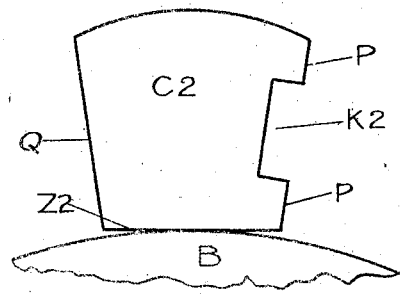
FIG. 3
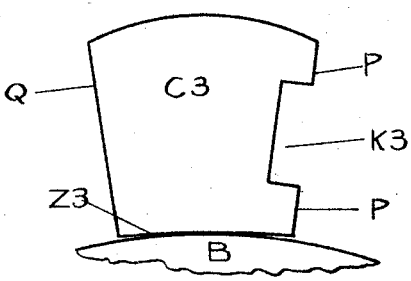
FIG. 4
*INVENTOR*
Cipriano Andrade Jr.

May 3, 1927.
C. ANDRADE, JR
1,626,907
DIFFERENTIAL
Filed July 9, 1924   4 Sheets-Sheet 2
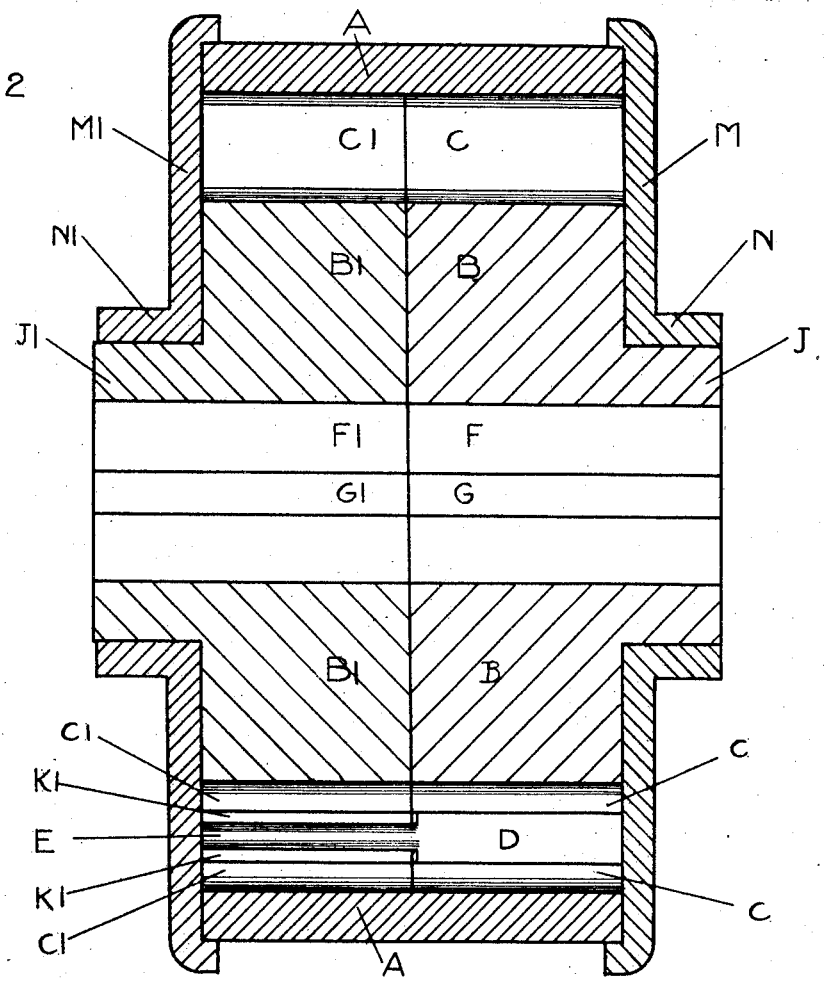
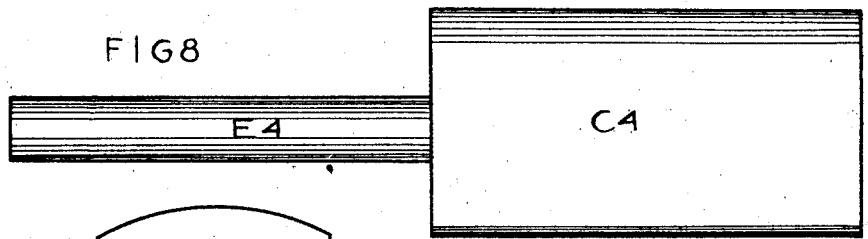
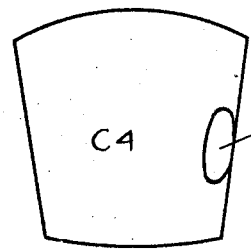
INVENTOR.
Cipriano Andrade jr.

May 3, 1927.

C. ANDRADE, JR 1,626,907

DIFFERENTIAL

Filed July 9, 1924 4 Sheets-Sheet 3

*INVENTOR.*

Cipriano Andrade Jr.

May 3, 1927.
C. ANDRADE, JR
1,626,907
DIFFERENTIAL
Filed July 9, 1924   4 Sheets-Sheet 4
FIG. 9 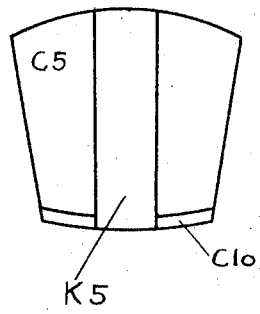 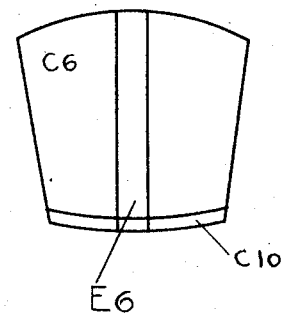 FIG. 10

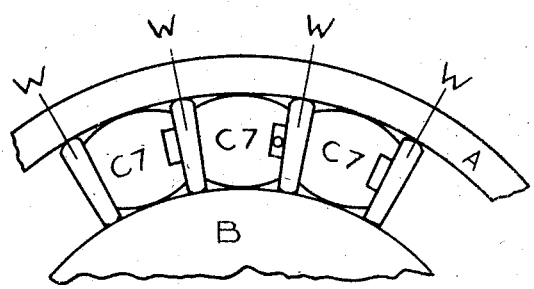
FIG 13

INVENTOR.
Cipriano Andrade Jr.

Patented May 3, 1927.

1,626,907

UNITED STATES PATENT OFFICE.

CIPRIANO ANDRADE, JR., OF NEW YORK, N. Y.

DIFFERENTIAL.

Application filed July 9, 1924. Serial No. 725,065.

My invention relates to differentials; and the object of my invention is to create a locking differential of simpler construction and cheaper production cost than those heretofore in use:

I attain these objects by the mechanism illustrated in the accompanying drawings, in which—

Figure 5:
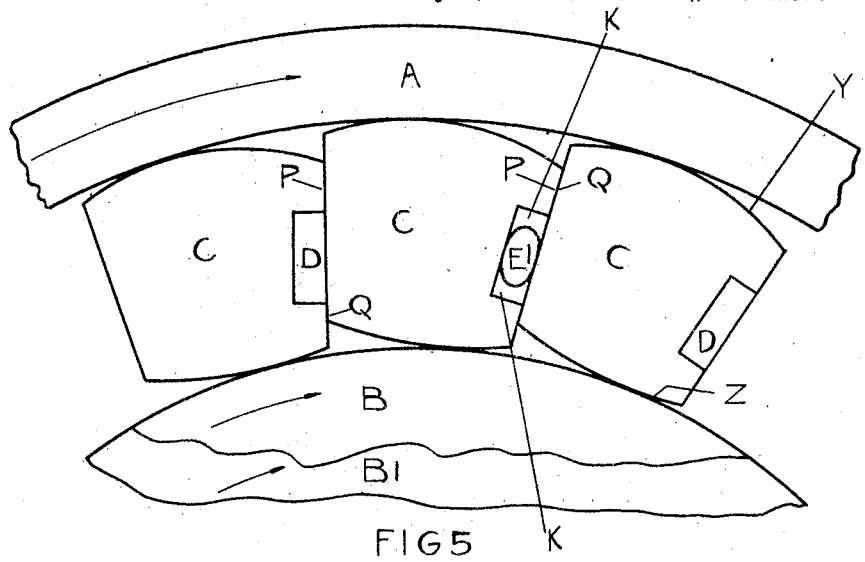
Figure 6:
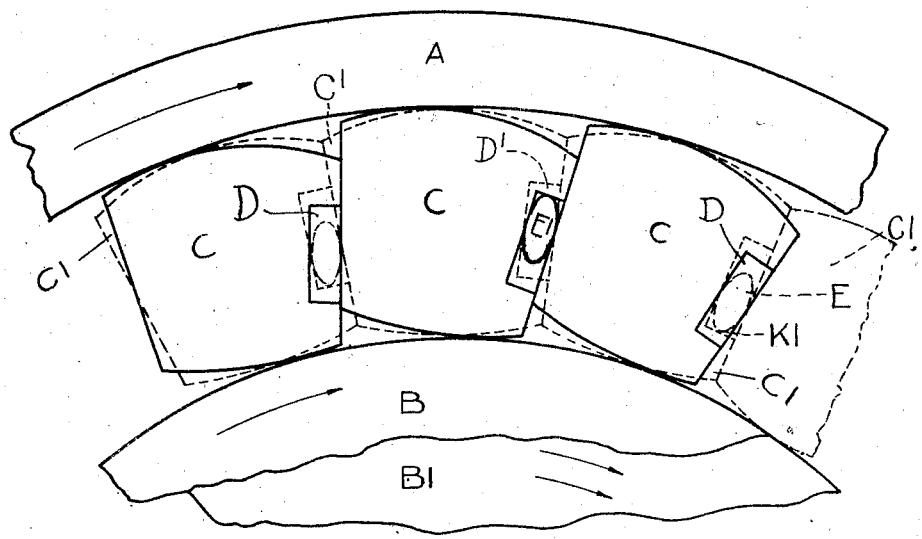
Figure 11:
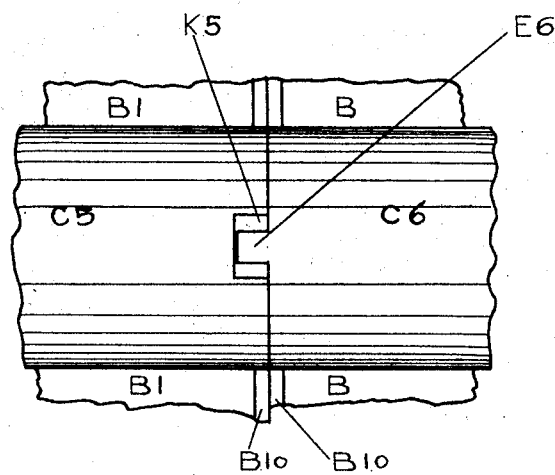
Figure 12:
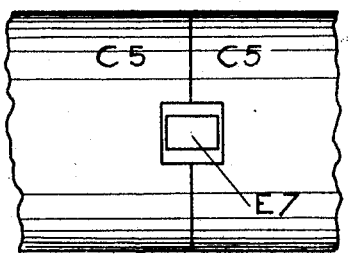

Fig. 1 is an end view of my device with one of the flanges M removed, and with all the locking members C and C¹ in neutral position; Fig. 2 is a longitudinal sectional elevation of my entire device on the line 2—2 of Fig. 1; Fig. 3 is an end view of an alternative form of locking member; Fig. 4 is an end view of another alternative form of locking member; Fig. 5 is a diagrammatic end view of part of my device performing complete locking function, with the locking members C locked on driven member B, and locking members C¹ (in exact alignment with locking members C) locked on driven member B¹, the single arrow on driving member A and on driven member B and on driven member B¹ indicates the uniform rotative speed of all the parts; Fig. 6 is a diagrammatic end view of part of my device performing its differential function, with the locking members C locked on driven member B, and with the locking members C¹ unlocked on driven member B¹. The single arrows on parts A and B indicate their uniform speed, and the two arrows on B¹ indicates its excess speed over A and B; Fig. 7 is an end view of an alternative form of locking member with control lug; Fig. 8 is a side view of Fig. 7; Fig. 9 is an end view of an alternative form of locking member with control recess between opposite locking members; Fig. 10 is an end view of a locking member with a control lug to fit into the recess shown in Fig. 9; Fig. 11 is a top assembly view of the locking members shown in Figs. 9 and 10 in conjunction with the driven members, and in neutral position; Fig. 12 is an alternative form of control arrangement; and Fig. 13 shows a mechanical equivalent of my device.

Similar letters refer to similar parts throughout the several views.

A is the driving member. The usual master gear is attached in any appropriate manner to driving member A. B is one of the driven members with keyway G to engage the key on the end of one of the driven shafts, and hole F to take the end of one of the driven shafts; and with lug J which may or may not have a bearing fit into lug N on flange M. B¹ is the other driven member with keyway G¹ to engage the key on the end of one of the driven shafts, and hole F¹ to take the end of one of the driven shafts, and with lug J¹ which may or may not have a bearing fit into lug N¹ on flange M¹. C are locking members which engage driving member A and driven member B. C¹ are locking members which engage driving member A and driven member B¹. In locking members C and C¹, the outer surfaces Y and the inner surfaces Z are both circumferential in form and convex in relation to the central longitudinal axis of the said locking members. In the alternative form of locking member C², the inner surface Z² is plane but nevertheless capable of partial rotation on the outer face of driven member B. In the alternative form of locking member C³, the inner surface Z³ is concave in relation to the central longitudinal axis of said locking member, but nevertheless capable of partial rotation on the outer face of driven member B. K are longitudinal recesses on one side of locking members C and K¹ are longitudinal recesses on one side of locking members C¹, K² is a longitudinal recess on one side of locking member C², and K³ is a longitudinal recess on one side of locking member C³. D are control rods with lugs E, the control rod D fitting preferably closely into recess K of locking member C, and the lug E fitting loosely into recess K¹ of the opposite locking member C¹. D¹ are control rods with lugs E¹, the control rods D¹ fitting preferably closely into recesses K¹ of locking members C¹, and the lug E¹ fitting loosely into recess K of the opposite locking member C. As an alternative form of control device, locking member C⁴ may have integral with itself a longitudinal lug E⁴ fitting loosely into longitudinal recess K of the opposite locking member C. As an alternative form of control device, locking member C⁶ may have integral with itself a transverse lug E⁶ fitting loosely into transverse recess K⁵ of the opposite locking member C⁵. As an alternative form of control, two opposite locking members C⁵ with adjoining recesses K⁵, can enclose an independent control lug E⁷, the length of E⁷ to be preferably slightly less than the length of K⁵. P is the side face of the locking members C, C¹, C², C³ which contains the longitudinal recesses K, K¹, K², K³. Q is the side face of the locking members C, C¹, C², C³ which contains no longitudinal recess. These side faces P and Q will preferably be plane and exactly radial to the centre of the driving member A and driven members B and B¹ when the locking members C and C¹ are in neutral position as shown in Fig. 1; although it would be possible to secure the function hereinafter stated if said side faces P and Q are not exactly plane or radial as described. As a matter of ease in functioning, it is desirable, although not absolutely necessary, to put chamfers B¹⁰ on both ends of the driven members B and B¹, and to put chamfers C¹⁰ on the locking members C, C¹, C², C³, C⁴, C⁵, and C⁶ and elsewhere as is usual in mechanical devices. Appropriate lubrication channels and bores can also be used as is well known in all mechanical devices. Lugs J, J¹, N and N¹ may be completely eliminated, their chief function being merely to decrease the wear between the locking members C or C¹ when differential rotation is occurring on driven members B or B¹. Even with lugs J, J¹, N and N¹ eliminated, the device will function as hereinafter described. It will of course be understood that flanges M and M¹ are preferably rigidly attached to driving member A in any appropriate manner; or said flanges M and M¹ may be attached so as to have free rotative motion but no substantial longitudinal motion with relation to driving member A, and in either case the function of my device will be as hereinafter stated.

It will further be understood that there is to be a slight clearance space between the locking surfaces Y and Z of the locking members C and C¹ and the locking surface of driving member A and the locking surface of driven members B and B¹, when the said locking members are in neutral position as shown in Fig. 1. This slight clearance space may be very minute and invisible to the eye, sometimes referred to as "contact" in common mechanical parlance, or it might be larger and visible to the eye, as shown visually between locking members C¹ and driving member A in Fig. 6, the only necessity of this space dimension being that it be sufficient to permit the driven member B or B¹ to turn freely in either forward or reverse direction when locking members C or C¹ are held in neutral position as hereinafter described.

In like manner there should be some slight clearance space between the side faces P and Q of the adjoining locking members, in order that when the locking is to occur, the said locking members may be forced by driving member A into rigid locking contact with the locking face of the driven members B and B¹ as hereinafter described. But in common mechanical parlance, it might be said that side faces P and Q of adjoining locking members are in "contact" with each other, and therefore it will be understood that the word "contact" as used generally in the claims means such contact as is usual in the moving and working parts of mechanical devices, which allows the usual minute clearance necessary to permit the usual mechanical motion of the various adjoining parts.

The mechanical equivalent of direct contact between the side faces of the adjoining locking members is illustrated by Fig. 13, wherein the intervening elements W, whose length is only equal to the length of the adjoining locking members, put the side faces of the adjoining locking members in indirect contact and produce exactly the same function as the direct contact of the faces of the locking members; and therefore it will be understood in my claims that the word "contact" as relating to the mutual arrangement of the locking members is intended to cover such a mechanical equivalent as disclosed by Fig. 13 or any other mechanical equivalent thereof.

The operation of my device is as follows:
Let us assume that all the parts are motionless, and that locking members C and C¹ are in neutral position as shown in Fig. 1.

Let us now assume that driving member A starts to rotate clockwise as shown by the arrow in Fig. 5. This rotative motion of driving member A will create frictional resistance against outer surfaces Y of locking members C and will cause each of said locking members C to begin a partial rotative motion about its own longitudinal axis. Owing to the form of said outer surface Y and said inner surface Z, this partial rotation of locking member C will result in locking contact between the inner face of driving member A and the outer surface Y of locking member C; and simultaneously therewith a locking contact will develop between the outer face of driven member B and the inner surface Z of locking member C; and simultaneously therewith, the adjoining side surfaces P and Q of all the locking members C will force all of said locking members C into substantially the same relative rotative locking position. At the same time, locking members C¹ will function in exactly the same manner in relation to each other, and in relation to driving member A and driven member B¹. When the locking members C and C¹ are thus all locked in the same direction between driving member A and driven members B and B¹, it will be noted by further reference to Fig. 5, that the lugs E¹ on control rods D¹ are located at the centres of recesses K, and therefore in that position, the said lugs E¹ do not interfere with any slight axial rotation by each pair of opposite locking members C and C¹ in relation to each other. At the same time, it will be observed that the lugs E¹, being integral with control rods D¹, hold the entire circumferential set of locking members C and the entire circumferential set of locking members C¹ from any relative circumferential movement about the surfaces of driven members B and B¹. And in like manner in Fig. 5, the lugs E (not shown) will be at the centre of recesses K¹ (not shown), this relative position of said lugs E and recesses K¹ being shown in Fig. 2.

From the foregoing description and the drawings, it is clear that if driving member A starts to rotate anti-clockwise, there will at once result a similar locking, but in the opposite direction, between driving member A, locking members C, and driven member B, and also between driving member A, locking members C¹, and driven member B¹.

Let us now assume that while driving member A is rotating clockwise, the automobile starts to turn with the axle keyed to driven member B¹ on the outside of the turn. The result will be that driving member A and driven member B, both rotating at the same speed, as shown by the single arrows in Fig. 6 will remain locked; but driven member B¹ will start to rotate more rapidly than A or B as shown by the double arrows on B¹ in Fig. 6. Thereupon the locking members C¹ will be partially rotated by driven member B¹ into neutral position as shown in Fig. 6, the said locking members C¹ being there shown in dotted lines for ease of identification. When locking members C¹ have reached neutral position, they cannot go further and lock anti-clockwise, because of the limitation of rotative motion of locking members C¹ about their own longitudinal axes by means of lugs E¹ in recesses K and lugs E in recesses K¹. This control function of lugs E¹ is illustrated in Fig. 6, wherein it will be noted that lug E¹ (instead of being in neutral position in recess K as shown in Fig. 5) is now locked against the upper end of recess K in locking member C, and therefore since control rod D¹ (integral with lug E¹) is solidly set in recess K¹ of locking member C¹, it will be seen that locking member C¹ cannot rotate about its own axis in an anti-clockwise direction any further, and therefore locking member C¹ is compelled to remain in neutral position, and cannot lock driven member B¹ from rotating freely ahead of driving member A. Likewise, by reference to the dotted lines in Fig. 6, it will be noted that the lugs E on the control rods D are locked against the lower end of recesses K¹ in locking members C¹, and therefore since these control rods D (integral with lugs E) are solidly set in recesses K of locking members C, it will be seen that these locking members C¹ cannot rotate about their own axes in an anti-clockwise direction any further, and therefore these locking members C¹ are compelled to remain in neutral position, and cannot lock driven member B¹ from rotating freely ahead of driving member A. The same function occurs if driven member B starts to rotate faster than driving member A, in which case locking members C¹ remain locked on driven member B¹, and locking members C go into neutral position over driven member B. The same functions for either driven member will occur if the driving member A is rotating anti-clockwise.

It is to be noted that lug E on control rod D, lug E¹ on control rod D¹, lug E⁴ on locking member C⁴, lug E⁶ on locking member C⁶, and control lug E⁷ on locking members C⁵, all perform the same functions to this extent, to wit: first, to hold each opposite pair of locking members from any substantial relative circumferential movement past each other about the circumference of driven members B and B¹; and second, to hold each pair of opposite locking members to limited rotative movement about their own longitudinal axes in relation to each other.

It is to be noted further that lugs E and E¹ and E⁴ produce one additional function which is not produced by lug E⁶ or E⁷, to wit: lugs E and E¹ and E⁴ hold each pair of opposite locking members in longitudinal axial alignment with each other, whereas this one function is not performed by lugs E⁶ or E⁷. On the other hand lug E⁶ or E⁷ is cheaper to manufacture than lugs E or E¹ or E⁴, and at the same time, approximate longitudinal axial alignment in each pair of opposite locking members may be secured by making said locking members of sufficient length, so that there is only a small clearance between the square ends of each locking member and the adjoining inner faces of flanges M and M¹.

From the foregoing statements it is clear that lug E or E¹ or E⁴ or E⁶ or E⁷ may properly be referred to and described as "a lug extending from one locking member into a recess in the opposite locking member." An essential feature of all these lugs and recesses is that the lug must be sufficiently smaller than the recess, so that each pair of opposite locking members may have sufficient relative circumferential motion about their own axes, so that when one locking member is locked between its driven member and the driving member, the opposite locking member may be free to rotate about its own axis into neutral position but not into an opposite locking position.

It will further be understood as appears in Fig. 1 that preferably the lugs E, E¹, E⁴, and E⁶ should be positioned alternately on the locking members.

While I have shown lugs connecting each pair of locking members in my drawings, it will be understood that even with one lug connecting one pair of locking members, my device will function. There are numerous locking differentials disclosed by the prior art, wherein the driving member is inside of the driven members, and it will be apparent that my device will function in similar fashion if the single driving member is located inside of the locking members, and the two driven members are located outside of the locking members.

It will be understood that the general principles of my device are merely illustrated by the drawings and specifications herein, and that my claims are intended to cover my invention as broadly as possible with relation to the prior art. And where the word "means" appears in my claims, it is not intended to be limited to the various forms disclosed by the drawings, but is to cover any mechanical equivalent for producing the results I have achieved as broadly as may be permitted in view of the prior art.

I claim:

1. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and means whereby the first plurality of locking members and the second plurality of locking members are held from any substantial relative circumferential movement past each other about the circumference of the driven members.

2. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and means whereby each pair of opposite locking members are held to a limited rotative movement about their own longitudinal axes in relation to each other.

3. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and means whereby each pair of opposite locking members are held in longitudinal axial alignment with each other.

4. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and means whereby the first plurality of locking members and the second plurality of locking members are held from any substantial relative circumferential movement past each other about the circumference of the driven members, and whereby each pair of opposite locking members are held to a limited rotative movement about their own longitudinal axes in relation to each other.

5. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and means whereby the first plurality of locking members and the second plurality of locking members are held from any substantial relative circumferential movement past each other about the circumference of the driven members, and whereby each pair of opposite locking members are held to a limited rotative movement about their own longitudinal axes in relation to each other, and whereby each pair of opposite locking members are held in longitudinal axial alignment with each other.

6. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and a lug extending from one locking member into a recess in the opposite locking member, whereby the said two opposite locking members are held from any substantial relative circumferential movement past each other about the circumference of the driven members, and whereby said two opposite locking members are held to a limited rotative movement about their own axes in relation to each other.

7. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and a lug extending from one locking member into a recess in the opposite locking member, whereby the said two opposite locking members are held from any substantial relative circumferential movement past each other about the circumference of the driven members, and whereby said two opposite locking members are held to a limited rotative movement about their own axes in relation to each other, and whereby said two opposite locking members are held in longitudinal axial alignment with each other.

8. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and a multiplicity of lugs extending from each plurality of locking members into a multiplicity of recesses in the opposite locking members, whereby the first and second plurality of locking members are held from any substantial circumferential movement in relation to each other about the circumference of the driven members, and whereby each locking member in each plurality of locking members is held to a limited rotative movement about its own axis in relation to each locking member in the opposite plurality of locking members.

9. In a differential; a first driven member; a second driven member; a driving member with its locking surface cylindrical in form; a first plurality of locking members between the driving member and the first driven member, said locking members being arranged in contact with each other; a second plurality of locking members between the driving member and the second driven member, said locking members being arranged in contact with each other; and a multiplicity of lugs extending from each plurality of locking members into a multiplicity of recesses in the opposite locking members, whereby the first and second plurality of locking members are held from any substantial circumferential movement in relation to each other about the circumference of the driven members, and whereby each locking member in each plurality of locking members is held to a limited rotative movement about its own axis in relation to each locking member in the opposite plurality of locking members, and whereby each locking member in each plurality of locking members is held in longitudinal axial alignment with each locking member in the opposite plurality of locking members.

10. In a differential; a driving member with its locking surface cylindrical in form; a first driven member with its locking surface cylindrical in form; a second driven member with its locking surface cylindrical in form; a first plurality of locking members between the driving member and the first driven member, said locking members being adapted to lock or unlock the driving member and the first driven member in either forward or reverse direction, said first plurality of locking members being in contact with each other, and having their contact surfaces in such form that each of said first plurality of locking members is held to a constant and limited rotative movement about its own axis in relation to each of the other of the first plurality of locking members; a second plurality of locking members between the driving member and the second driven member, said locking members being adapted to lock or unlock the driving member and the second driven member in either forward or reverse direction, said second plurality of locking members being in contact with each other, and having their contact surfaces in such form that each of said second plurality of locking members is held to a constant and limited rotative movement about its own axis in relation to each of the other of the second plurality of locking members; and means whereby the first and second pluralities of locking members are held from any substantial circumferential movement in relation to each other about the circumference of the driven members, and whereby each locking member in each plurality of locking members is held to a limited rotative movement about its own axis in relation to each locking member in the opposite plurality of locking members, and whereby each locking member in each plurality of locking members is held in longitudinal axial alignment with each locking member in the opposite plurality of locking members.

11. In a differential; a driving member with its locking surface cylindrical in form; a first driven member with its locking surface cylindrical in form; a second driven member with its locking surface cylindrical in form; a first plurality of locking members between the driving member and the first driven member, said locking members being adapted to lock or unlock the driving member and the first driven member in either forward or reverse direction, said first plurality of locking members being in contact with each other, and having their contact surfaces in such form that each of said first plurality of locking members is held to a constant and limited rotative movement about its own axis in relation to each of the other of the first plurality of locking members; a second plurality of locking members between the driving member and the second driven member, said locking members being adapted to lock or unlock the driving member and the second driven member in either forward or reverse direction, said second plurality of locking members being in contact with each other, and having their contact surfaces in such form that each of said second plurality of locking members is held to a constant and limited rotative movement about its own axis in relation to each of the other of the second plurality of locking members; and a multiplicity of lugs extending from each plurality of locking members into a multiplicity of recesses in the opposite locking members, whereby the first and second pluralities of locking members are held from any substantial circumferential movement in relation to each other about the circumference of the driven members, and whereby each locking member in each plurality of locking members is held to a limited rotative movement about its own axis in relation to each locking member in the opposite plurality of locking members, and whereby each locking member in each plurality of locking members is held in longitudinal axial alignment with each locking member in the opposite plurality of locking members.

12. In a differential; a driving member with its locking surface cylindrical in form; a driven member with its locking surface cylindrical in form, the locking surface of said driven member being concentric with the locking surface of the driving member; and a multiplicity of locking members all in contact with each other, and filling the entire circumferential space between the driving member and the driven member, said locking members being adapted to lock or unlock the driving member and the driven member in either forward or reverse direction.

CIPRIANO ANDRADE, Jr.